Feb. 22, 1944. M. HALLEAD 2,342,337
MEANS FOR HANDLING COLLAPSIBLE TUBES
Original Filed May 24, 1938
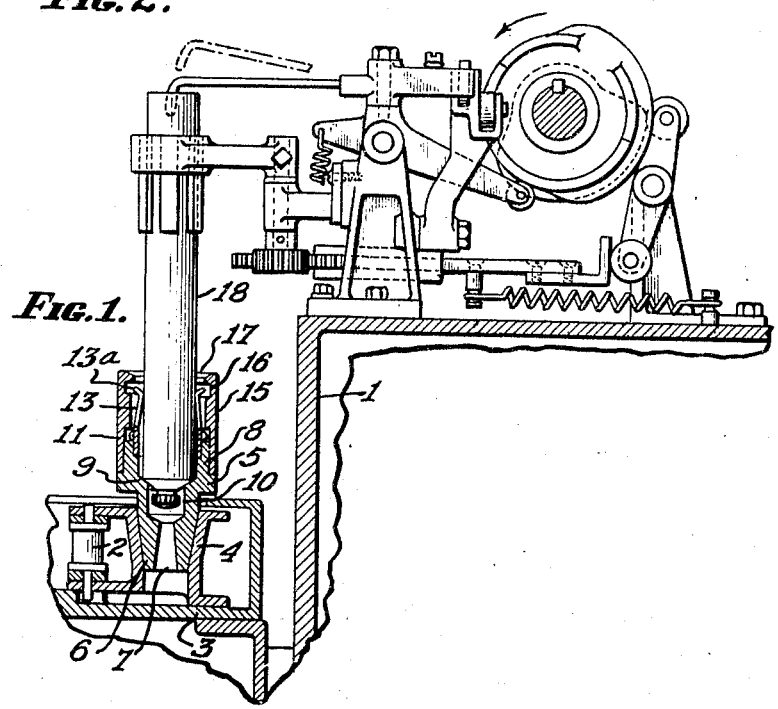
INVENTOR.
MERVIL HALLEAD.
BY
ATTORNEYS.

Patented Feb. 22, 1944

2,342,337

UNITED STATES PATENT OFFICE 2,342,337

MEANS FOR HANDLING COLLAPSIBLE TUBES

Mervil Hallead, Detroit, Mich., assignor to The Karl Kiefer Machine Company, Cincinnati, Ohio, a corporation of Ohio Original application May 24, 1938, Serial No. 209,765, now Patent No. 2,298,479, dated October 13, 1942. Divided and this application August 10, 1942, Serial No. 454,237

3 Claims. (Cl. 198—131)

This is a division of my co-pending application, Serial No. 209,765 filed May 24, 1938, now Patent No. 2,298,479, issued October 13, 1942.

My invention has to do with the specific operation of spreading or fish tailing the ends of collapsible tubes after filling and prior to clamping and sealing. My invention can be employed in connection with any means or method in current use for effecting an end closure in collapsible tubes; but it was especially designed for and is of particular importance in connection with the sealing of collapsible tubes by welding, i. e., by interfusion of the juxtaposed tube walls.

In a co-pending application in my name and that of Paul R. Fechheimer, Ser. No. 174,079 filed November 11, 1937, we have set forth a machine for the cleaning, filling and sealing of tubes, and in making a disclosure of my prevent invention, I shall describe it in connection with portions of the machine of the said co-pending application, it being understood however, that the utility of this invention is by no means confined to that machine.

In handling collapsible tubes, the tubes are arranged in holders on a conveyor in up-side-down position. One end of the tube is closed by the usual cap and is arranged downwardly, while the other end is open. In the machine to which I have referred, the tubes on the conveyor first come to a cleaning station where any foreign matter is removed by air. Next they pass to a filling station where a measured quantity of material is fed into each tube. Next they pass to a station where the tube ends are spread so as to fishtail them. Next they pass to a station where the spread ends of the tubes are clamped and where the tube ends are sheared to a uniform height. Next they pass to a welding station where the ends are again clamped and are welded by interfusion of the metal of the tube walls. Next, if desired, the tubes may pass to a folding station where the ends of the tubes are folded over upon themselves.

Though of some importance in any method of sealing the ends of collapsible tubes, it is of primary and fundamental importance in sealing tubes by welding, that the flattened ends of the tubes be free of any contamination by the tube contents. In the particular machine to which I have referred, the material is fed into the tubes at the filling station under pressure from a suitable spout. The material, even of viscous nature, packs well in the tubes. After the charge has been placed in each tube, the tube is lowered sharply, pulling it away from the spout and cleanly breaking the material, so that strings of it do not contaminate the portions of the tube walls left for sealing.

The spreading operation carried on on the tube walls, is a fairly rapid operation carried on preferably by a pair of fingers which are caused to enter the open end of the tube and then are drawn apart so as to fishtail the end. When the open end of the tube is free, the spreading or fishtailing of the tube walls produces a flattening of the tube elsewhere, so that the cross section of the tube becomes more and more sharply oval from the cap end to the open or bottom end. This causes the level of the material to rise in the tubes, and because the action is abrupt, this material is likely to become sprayed or spattered on the ends of the walls which are intended to be welded. For this reason it has been necessary to introduce into the tubes less material than they would otherwise hold, if satisfactory welding is to be regularly accomplished. Moreover, the tubes when completed have a spindly appearance and do not seem to be thoroughly filled.

It will be clear also that the tube itself must be larger and therefore more expensive than it would otherwise need be.

The above statement indicates exemplary circumstances of use of my present invention, which is directed to means for holding collapsible tubes while they are being moved along a path from work station to work station and while operations, of which the above are exemplary, are being performed on them.

It is an object of my invention to provide a holder which will serve to maintain the tubes accurately in upright position and to locate them at work stations in an accurate position with respect to instrumentalities which are to operate upon them. This is generally important; but is especially important where the operating means include elements which are power actuated to embrace the tubes.

It is an object of my invention to provide a tube holder which will serve to locate the tubes and maintain their positions as aforesaid without injury to the tubes themselves or appreciable distortion of the tube walls, and to provide a holder in which the tubes are readily insertable and from which they may be readily disengaged.

It is an object of my invention to provide a mechanism of such character that the parts which must be interchanged when filling tubes of different diameters are simple in character and few in number, and a holder which is in itself adaptable for use with tubes of different sizes throughout a narrow, but none-the-less useful range.

For details of an exemplary mechanism with which the structure of the present invention may be used, reference is made to the copending applications hereinabove recited.

These and other objects of my invention which will be set forth hereinafter or will be apparent to one skilled in the art upon reading this specification, I accomplish by that certain construction and arrangement of parts of which I shall now describe a certain exemplary embodiment, as applied to the machine of the said co-pending application.

Reference is made to the drawing wherein:

Figure 1 is a sectional view showing one of my devices in vertical section, a conveyor with which it is engaged, and exemplary apparatus for operating upon a tube held in my device. This apparatus is exemplary only of one mode of use of my device and will not hereinafter be described.

Figure 2 is a partial elevational view of a strip configured to provide my spring fingers.

In Figure 1 I have indicated at 1, the frame of the machine of the said co-pending application. This machine has a conveyor 2 mounted in a conveyor frame indicated generally at 3. For filling tubes of different lengths, the conveyor frame can be raised or lowered without disconnecting the conveyor drive. The conveyor is so constructed as to present sockets 4 in which tube holders may be mounted.

My tube holders comprise a body 5 having a neck 6 adapted to be engaged in the socket 4. The neck and the socket are preferably given a corresponding taper, so that the tube holders are frictionally retained therein. The holder body furthermore is perforated as at 7, for the reception of tube elevating means operating through the conveyor, ejector means and/or a portion of the mechanism whereby the filler device is rendered inoperative if no tube is in the holder.

The body 5 has an upper tubular portion 8 having a bore of such size as will accept the tube, a shoulder 9 upon which the shoulder of the tube rests, and a bore 10 to accept the cap. Near the upper end of the tubular portion 8 I provide an internal annular groove 11. A device presenting spring fingers is used for holding the tube. This device may be made of thin, springy sheet metal as shown in Figure 13, and consists of a body portion 12, and a series of spring fingers 13. The metal strip illustrated in Figure 13 is cut to length, bent to a circular form and inserted in the upper tubular portion 8 of the body of the holder. To maintain its position, a convenient way is to provide the body 12 with outwardly struck portions or bosses 14, which can engage as shown, in the annular groove 11.

A tubular cap portion 15 completes the tube holder. This member has a part which slips over or may be threaded on the tubular portion 8 of the tube holder body. Internally it has an annular groove 16. The entrance end of the member may be beveled as at 17, to facilitate the insertion of the tubes. The spring fingers 13 are bent slightly inwardly as shown; but their extreme ends are bent outwardly as at 13a to facilitate insertion of the tube, the outwardly bent portions being arranged so as to enter the annular groove 16.

When the tube 18 is inserted in this holder it will be seen that the shoulder of the tube rests against the shoulder 9, while the spring fingers 13 hold the tube in upright position and center it. It will furthermore be apparent that but one size of tube holder is required for any given diameter of tube, and also that since the tube is frictionally held, it may be located in a holder in such a way that the fishtailing of the ends and the ultimate sealing of the tube can bear any desired relationship to the indicia printed upon the tube.

While of especial importance in connection therewith, the utility of my tube holder is by no means confined to its employment with the other mechanisms herein mentioned. My holder has the functions noted above, whether so employed or not. It has the further important function of permitting fishtailing of the ends of the tube without the formation of a peripheral indentation in the midsection of the tube, such as would be formed if the tube were held in a closely fitting non-resilient holder.

Modifications may be made in my invention without departing from the spirit of it.

Having thus described my invention, what I claim as new and desire to secure by Letters Patent is:

1. A holder for collapsible tubes comprising a portion to be engaged by a conveyor and an extension thereon hollowed to receive a tube, said extension providing a conical shoulder on which the conical shoulder of said tube may rest whereby the shouldered end of said tube is located axially, and a plurality of circularly arranged and axially extending spring fingers for contacting the tube at a circumferential position substantially spaced from the shouldered end of said tube, and for holding it in a desired position with respect to said holder.

2. A holder for collapsible tubes comprising a body portion having a part to be engaged by a conveyor, and having a hollow extension, said body portion being so shaped as to provide a shoulder on which the shoulder of a collapsible tube may rest, a member presenting a plurality of circularly arranged spring fingers engaged in said first mentioned part, and a hollow tubular cap member engaged over said first mentioned part and surrounding said spring fingers.

3. A holder for collapsible tubes comprising a body portion having a part to be engaged by a conveyor, and having a hollow extension, said body portion being so shaped as to provide a shoulder on which the shoulder of a collapsible tube may rest, a member presenting a plurality of circularly arranged spring fingers engaged in said first mentioned part, and a hollow tubular cap member engaged over said first mentioned part and surrounding said spring fingers, said last mentioned member having a conical entrance to facilitate insertion of tubes and an annular interior groove, the ends of said spring fingers being bent over and positioned so as to be capable of lying in said groove.

MERVIL HALLEAD.